June 17, 1930.                L. L. FOJTIK                1,765,143
                                COLTER
                         Filed Jan. 5, 1929         2 Sheets-Sheet 1
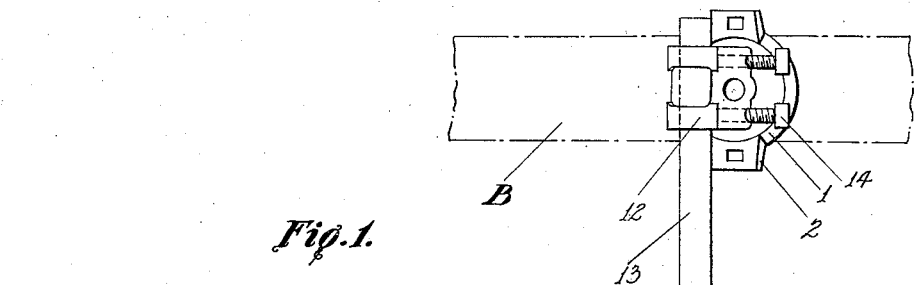
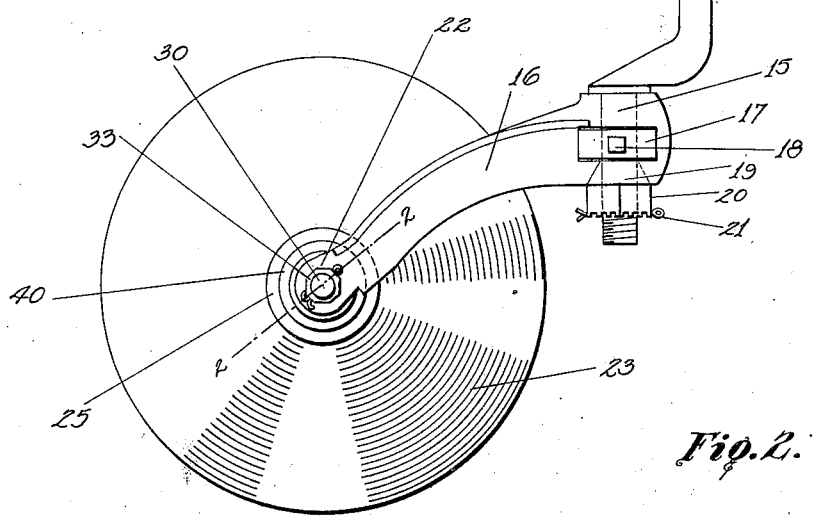
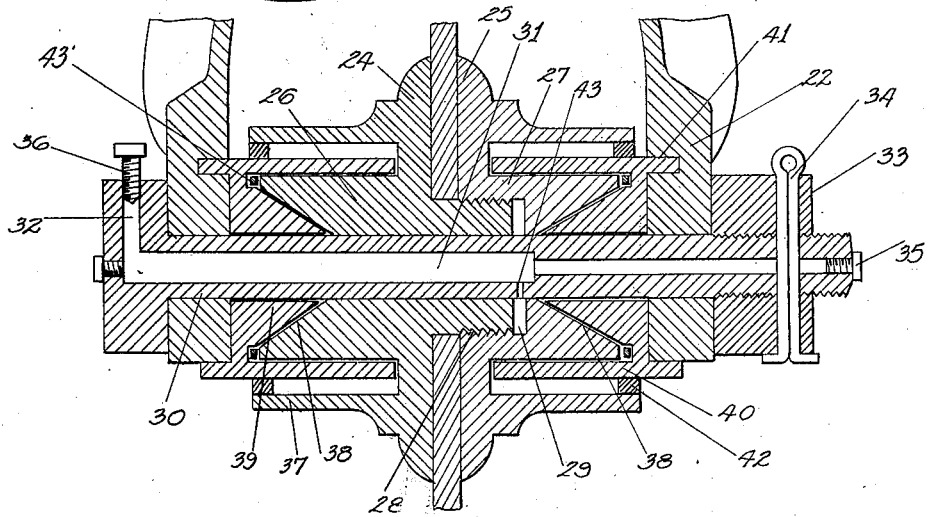
Louis L. Fojtik.
INVENTOR
BY Victor J. Evans
ATTORNEY June 17, 1930.    L. L. FOJTIK    1,765,143
COLTER
Filed Jan. 5, 1929    2 Sheets-Sheet 2

Louis L. Fojtik.
INVENTOR
BY Victor J. Evans
ATTORNEY

Patented June 17, 1930

1,765,143

UNITED STATES PATENT OFFICE

LOUIS L. FOJTIK, OF NEEDVILLE, TEXAS

COLTER

Application filed January 5, 1929. Serial No. 330,642.

My present invention has reference to colters for plows and my primary object is the provision of a mount for disc colters but which may be also employed as a mount for a disc plow or disc cultivators, in which the disc is firmly supported from the plow beam and is susceptible to vertical as well as lateral adjustment thereon, and further wherein a novel and lubricating bearing is provided between the hub and the shaft of the disc.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a side elevation of the improvement, the plow beam being indicated by the dotted lines.

Figure 2 is an enlarged view approximately on the line 2—2 of Figure 1.

Figure 3:
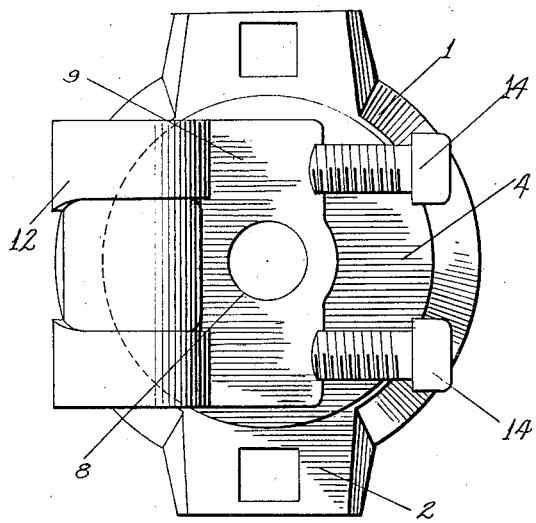
Figure 3 is a plan view of the support or bearing for the shank or standard for the disc.
Figure 4:
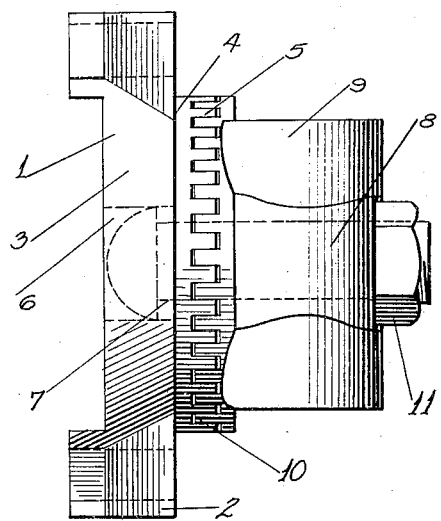
Figure 4 is a side elevation thereof.
Figure 5:
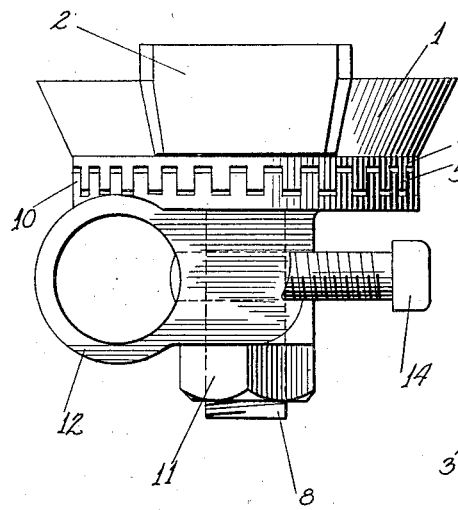
Figure 5 is a plan view thereof.
Figure 6:
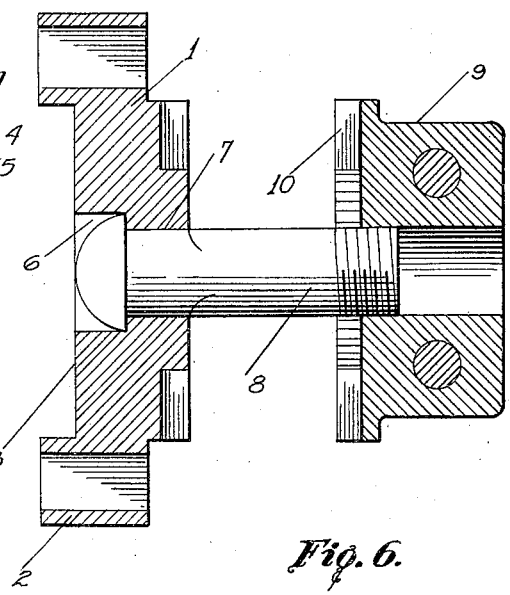
Figure 6 is a substantially central longitudinal sectional view therethrough showing the parts separated.

On a plow beam B I secure, preferably by a suitable U-bolt a metal disc member 1. The disc has oppositely extending ears 2 for the reception of the arms of a U-bolt or like connecting element. The disc has its inner face centrally recessed, as at 3, and in this recess one side of the plow beam is received. The disc member 1 has on its outer face a circular or round extension 4 that is peripherally provided with equidistantly spaced teeth 5. The element 1 which I may have termed a disc may, of course, be in the nature of a plate and as the round extension thereon is in the nature of a disc the said member will be hereinafter referred to as a plate, 1, and the part 2 as the disc extension on the plate. The plate 1 is centrally provided with an opening that extends through the disc extension 4, the said plate having a pocket 6 that surrounds the opening and the said opening 7 is preferably squared to receive the squared end of a bolt member 8, the head of the bolt being received in the pocket 6. The bolt has its threaded end passing through a central bore in an outer member that is in the nature of a metal block or casting 9. The block 9 has an inner rounded face or enlargement that is provided with teeth 10 to coengage with the teeth 5 in the disc extension 4 on the plate 1. When the teeth are so engaged there is screwed on the bolt 8 a nut 11. The block 9, at one side thereof is provided with spaced outstanding ring members in the nature of sockets 12, respectively, and through these sockets the rounded shank or standard of the mount passes. For distinction the shank is indicated by the numeral 13. The outer face of the block, in a line with the ring members which I have termed the sockets 12, is thickened and is provided with threaded openings that communicate with the sockets and screwed through these openings there are bolts 14 which are designed to frictionally contact with the standard 13. By an arrangement as above set forth it will be noted that the standard 13 may be arranged at desired vertical angles with respect to the plow beam B and will be effectively supported when so adjusted.

The standard 13 is provided with the usual offset lower end from which extends a rounded stem 15. This stem passes through a bore or opening at the connected end for the arms of a yoke 16. The connected end of the yoke has on one side an enlargement 17 provided with a threaded opening through which is screwed a bolt 18 that contacts with the stem 15. The bore provided in the yoke through which the stem 15 passes has its lower wall flared for the reception of a conical end 19 of a castillated nut 20. The threaded end of the stem 15 is provided with one or more openings for the reception of a cotter pin 21 that passes through the castillation of the nut 20.

The yoke has its arms rounded downwardly and the ends of the said arms are enlarged and rounded, as at 22.

The disc colter or the like is indicated by the numeral 23. The disc 23, is, of course, provided with the usual central opening and the opposite faces of the disc are contacted by what I will term the inner shouldered portions 24 and 25 of the sectional hub. The sections of the hub are for distinction indicated by the numerals 26 and 27. The section 26 is provided with a round extension that passes through the mentioned opening in the disc 23 and the outer end of this extension is threaded, as at 28, and is screwed in a threaded socket 29 in the hub section 27. The hub sections are provided with the usual alining openings for the reception of a shaft 30. The shaft in the present instance comprises a headed member that is provided with a bore 31 that has a lateral passage 32 extending through the head of the said shaft, and the outer end of the shaft is threaded and is engaged by a nut 33 through which is passed a holding element in the nature of a cotter pin 34 that also passes through the said end of the shank. The bore 31 has its ends closed by screw plugs 35, respectively, and the passage 32 has its end closed by a similar plug 36. The hub, outward of the mentioned portions thereof are provided with sleeve extensions 37 projecting from the opposite sides of the shoulders 24 and 25 and the ends of the inner portions of the hub sections are each formed with a conical depression 38, respectively. These depressions are designed to receive therein the conical extensions 39 upon the sectional dust sleeves 40, respectively.

The sleeves are, of course, formed on the outer edges of the conical elements 39, and project a suitable distance beyond the outer flat faces of the said portions 39 and are received in an annular groove 41 on the inner face of each of the rounded enlargements 22 of the arms of the yokes. Preferably there is a packing or washer 42 between the dust sleeves 40 and the outer annular extensions 37 of the hub sections so that the hub construction is rendered positively dust proof. The bore 31 of the shaft 30 is provided with a port 43 that communicates with the bore 32 of the hub section 27 and permits a lubricant which is delivered through the passage 32 and to the bore 31 to be directed between the axle and the parts that contact therewith.

With my construction it will be apparent that a colter or like disc may be adjusted vertically or horizontally with respect to the plow beam and effectively held in such adjusted position. Also with my construction it will be seen that the disc 23 has its hub properly and effectively lubricated so that little or no friction will occur in the turning of the disc.

Between the reduced outer ends of the hub sections and the walls of the dust ring there are arranged split spring ring members 43', which take care of any end thrust that might be imparted to the disc and its hub.

The construction and advantages of my invention will be readily apparent by those skilled in the art so that further detailed description will not be required. It is believed, however, necessary to state that I do not wish to be restricted to the precise details herein set forth and, therefore, hold myself entitled to make such changes therefrom as fairly fall within the scope of what I claim.

Having described the invention, I claim:

1. A colter mount comprising a plate to be clamped on a plow beam and said plate having an outer disc extension which is toothed, a block, pivotally secured to the plate and having teeth for engaging with the teeth of the plate, said block having spaced sockets for a colter standard, and binding bolts screwed through the block and entering the sockets for frictionally engaging with the standard.

2. A colter mount comprising a plate having its inner face notched for the reception of the side and edges of a plow beam and having ears for the reception of a U-bolt for clamping the plate on the beam, said plate having an outer disc extension which is toothed, a removable and adjustable pivot passing centrally through the plate, a block mounted on the pivot and having a toothed inner surface to engage with the teeth of the plate, adjustable holding means on the pivot contacting the block, said block having spaced sockets to receive a colter standard therethrough, and binding nuts screwed through the block entering the sockets and engaging with the standard.

3. A colter mount comprising a plate to be clamped on a plow beam and said plate having an outer disc extension which is toothed, a block pivotally secured to the plate and having teeth for engaging with the teeth of the plate, said block having spaced sockets for a colter standard and binding bolts screwed through the block and entering the sockets for frictionally engaging with the standard, a yoke in which a colter disc is journaled, removable means holding the yoke on the standard, a binding element between the yoke and standard for sustaining the yoke horizontally adjusted on the standard.

In testimony whereof I affix my signature.

LOUIS L. FOJTIK.